US011931842B2

(12) United States Patent
Seuthe

(10) Patent No.: US 11,931,842 B2
(45) Date of Patent: Mar. 19, 2024

(54) METHODS, (MEASURING) DEVICES, AND COMPONENTS THEREOF, FOR IDENTIFYING EVENTS IN A MATERIAL-PROCESSING OR MATERIAL PRODUCTION PROCESS USING EVENT PATTERNS

(71) Applicant: QASS GMBH, Wetter (DE)

(72) Inventor: Ulrich Seuthe, Wetter (DE)

(73) Assignee: Qass GmbH, Wetter (DE)

( * ) Notice: Subject to any disclaimer, the term of this patent is extended or adjusted under 35 U.S.C. 154(b) by 952 days.

(21) Appl. No.: 16/965,339

(22) PCT Filed: Dec. 11, 2018

(86) PCT No.: PCT/EP2018/084411
§ 371 (c)(1),
(2) Date: Aug. 7, 2020

(87) PCT Pub. No.: WO2019/115553
PCT Pub. Date: Jun. 20, 2019

(65) Prior Publication Data
US 2021/0165396 A1    Jun. 3, 2021

(30) Foreign Application Priority Data
Dec. 11, 2017   (DE) .......................... 102017011368.8

(51) Int. Cl.
*B23Q 17/09*   (2006.01)
*G01D 5/00*    (2006.01)
(Continued)

(52) U.S. Cl.
CPC ............. *B23Q 17/099* (2013.01); *G01D 5/00* (2013.01); *G05B 19/41875* (2013.01);
(Continued)

(58) Field of Classification Search
CPC .. B23Q 17/00–099; G01D 5/00; G05B 19/04; G05B 19/418; G05B 19/41875;
(Continued)

(56) References Cited

U.S. PATENT DOCUMENTS 4,574,633 A * 3/1986 Ohnuki .............. G05B 19/4065
700/79
4,636,780 A * 1/1987 Thomas .............. B23Q 17/0971
73/104

(Continued)

FOREIGN PATENT DOCUMENTS

EP         1873634         1/2008
KR    100226277 B1 * 10/1999   ......... B23Q 17/0957
(Continued)

OTHER PUBLICATIONS

International Search Authority, International Search Report (Translation) of PCT/EP2018/084411 (dated Jul. 24, 2019).

*Primary Examiner* — Nguyen Q. Ha
(74) *Attorney, Agent, or Firm* — UBG Law; Brian E. Turung

(57) ABSTRACT

A measuring device comprising a sensor for the high frequency detection of a measurement variable, such as sound, structure-borne noise, current, voltage, optical or magnetic measurement values and the like, with an operator network comprising at least one operator. An operator network that includes a notification operator, a machine control operator and/or a difference operator. The devices can be configured to identify events in a material-processing and/or material production process on the basis of a multidimensional data stream obtained during the process and having temporally resolved frequency and energy information, and to the use of defect patterns and/or event patterns and/or energy data, the (Continued)

data being supplied to a pattern operator or multiple pattern operators arranged in parallel or one after the other.

22 Claims, 14 Drawing Sheets

(51) Int. Cl.
*G05B 19/418* (2006.01)
*G05B 23/02* (2006.01)
*G06F 8/34* (2018.01)
*G05B 19/04* (2006.01)
*G06F 3/0481* (2022.01)
*G06F 8/20* (2018.01)

(52) U.S. Cl.
CPC ............ *G05B 23/024* (2013.01); *G06F 8/34* (2013.01); *G05B 19/04* (2013.01); *G05B 19/418* (2013.01); *G05B 2219/23258* (2013.01); *G05B 2219/32368* (2013.01); *G05B 2219/37435* (2013.01); *G06F 3/0481* (2013.01); *G06F 8/24* (2013.01)

(58) Field of Classification Search
CPC .......... G05B 23/24; G05B 2219/23258; G05B 2219/32368; G05B 2219/37435; G06F 3/0481; G06F 8/24; G06F 8/34
See application file for complete search history.

(56) References Cited

U.S. PATENT DOCUMENTS

| | | | |
|---|---|---|---|
| 11,086,290 B2* | 8/2021 | Yoon | ....................... G05B 23/02 |
| 2018/0154484 A1* | 6/2018 | Hall | ..................... B23K 26/342 |

FOREIGN PATENT DOCUMENTS

| | | | | |
|---|---|---|---|---|
| KR | 20180083990 A | * | 7/2018 | .......... B23Q 17/007 |
| WO | 2010051954 | | 5/2010 | |
| WO | 2017071812 | | 5/2017 | |
| WO | 2017105867 | | 6/2017 | |
| WO | 2017192821 | | 11/2017 | |

\* cited by examiner

METHODS, (MEASURING) DEVICES, AND COMPONENTS THEREOF, FOR IDENTIFYING EVENTS IN A MATERIAL-PROCESSING OR MATERIAL PRODUCTION PROCESS USING EVENT PATTERNS

CROSS-REFERENCE TO RELATED APPLICATIONS

The present disclosure claim priority to PCT Application Serial No. PCT/EP2018/084411 filed Dec. 11, 2018, which in turn claims priority on German Application Serial No. DE102017011368.8 filed Dec. 11, 2017.

FIELD OF INVENTION

The invention relates to methods, (measuring) devices, and components thereof, for identifying events in a material processing or production process on the basis of a multi-dimensional data stream obtained during the process with time-resolved frequency and energy information using event patterns.

BACKGROUND OF DISCLOSURE

The invention is applicable to all processes in which high-frequency information can be obtained during and/or after material processing or production by means of, in particular, acoustic and/or magnetic sensors, as described, for example, in WO 2010/051954 and WO 2017/071812, for example during machining, injection moulding, forming, inductive hardening, welding or the like. In the following, the invention is described for the purpose of illustration using the example of bending and straightening. However, the explanations are also transferable to the other applications.

During bending and straightening on a straightening press, a punch acts repeatedly and at different points on a component to be straightened, for the purpose of plastic deformation, until the desired concentricity is achieved. A typical bending and straightening process, for example, of a driveshaft made of hardened steel for the automotive industry can last for about one or two minutes with load phases in the order of typically less than one second followed by substantially comparably long relief phases. The deformation energy acting on the component may cause damage that is not easily visually identifiable, especially microcracks, to the component, and the bending and straightening device may also become damaged or worn. To identify such damage in material processing or production processes, it is known from WO 2010/051954 to continuously detect sound signals during the bending and straightening process by means of a sound sensor and to feed said signals to a multi-dimensional evaluation with pattern recognition in order to identify typical events, such as cracks or tool breakage.

FIG. 1 illustrates the data stream recorded as a function of time t, frequency f and intensity I, as illustrated in WO 2010/051954. The landscape illustrated here, for example three-dimensionally, shows patterns which can be assigned to different events.

For example, in stress phase 1, a landscape is discernible which differs from the landscapes in stress phase 2 or in relief phases 3. If the landscapes are compared with known patterns, for example for a crack, it can be determined whether the component is free of faults or faulty and thus is to be scrapped. For example, if a landscape 4 in the region of stress phase 1 corresponds to a pattern for a crack, the component is rejected as faulty. If, on the other hand, this landscape 4 corresponds to the pattern for an operating noise, as in the region of the previous stress phase 2, the component is free of faults.

What is difficult here is accurate discrimination. By means of simple pattern recognition, for example by the known comparison of the recorded landscape with a comparison envelope of a comparison pattern, a degree of agreement can be determined. In practice, however, it has been shown that the degree of agreement is often well below 100% and, additionally, that a number of patterns can be identified for different events with roughly the same level of agreement, for example with 80% probability for one pattern and with 65% probability for another pattern. Depending on the quality requirements for the component, this leads to components that are free of faults being incorrectly rejected as faulty, or faulty components passing through as being free of faults.

In addition, the adaptation to the particular process is complex. Not only do databases have to be provided and/or adapted for the process and the particular process environment, but the individual adaptation of the comparison logic usually also requires reprogramming. For example, the patterns for permissible deviations and for interfering or operating noise during bending and straightening differ considerably from those for injection moulding; the optimal comparison logic is also always different for different processes.

SUMMARY OF INVENTION

Proceeding herefrom, the object of the invention is to create methods, devices, and components thereof for identifying events in a material processing or production process on the basis of a multi-dimensional data stream obtained during the process with time-resolved frequency and energy information using event patterns which, with more flexible adaptability, allow improved discrimination.

This object is achieved according to the features of the independent claims.

Advantageous embodiments can be found in the dependent claims.

The invention provides a measuring device, for example a measuring instrument, with an operator network advantageously easily adaptable to the particular material processing and/or production process via a graphical user interface or the like, with at least one decision operator and preferably further operators, in particular arranged in cascading and/or parallel form, in particular pattern operators, as well as methods and devices based thereon.

According to the invention, some embodiments of the measuring device allow fully automatic decision making, for example OK or not OK during or after material or component processing or production, and can be adapted intuitively, easily and precisely to the particular material, component, production and/or processing framework conditions, advantageously by using predefined and/or parameterisable operators and/or operator networks and, if necessary use of given standard parameters and/or patterns for certain material, component, manufacturing and/or processing standard framework conditions or scenarios. In particular, it may be provided to adapt such predefined parameters and/or patterns as templates by: characteristic fields/parameterisations; further operators and linking of same, and/or new definition of operators.

The measuring device according to the invention can comprise a sensor for high-frequency identification of a measurand, such as sound, structure-borne sound, current, voltage, optical or magnetic measurement values and the like, or can be coupled to such a sensor, and has an operator, which can be incorporated in an operator network.

The operator system according to the invention is an independent, so to speak, configuration environment or programming language, especially for measuring instruments. Operators are provided for specific sensors or in general and provide the measurement values for the processing operators.

Sensors that support existing communication protocols, such as OPC-UA, can be incorporated via an OPC-UA operator.

In this way, almost any number of different sensors can be included in programmed analyses.

The pattern recognition, which can be programmed in this way, makes it possible to identify any signals (in the case of sound or structure-borne sound these signals can represent noises and well-known work emissions of machines), calculate their specific characteristics, and eliminate them from the data stream in real time.

This results in highly dynamic signal or noise filters that satisfy all the criteria of a noise-cancellation function.

The invention thus allows a measuring device to precisely remove extremely "loud" basic signals from the data stream and then to identify small peculiarities in the "remaining" data stream.

In accordance with the invention, this can be achieved in such a way that an input sensor data stream is searched by pattern operators for known noises, these noises are then eliminated, and a new data stream is produced, which can be analysed and processed by subsequent and/or parallel further pattern operators until the results are analysed so as to be ready for decision-making and can be fed to a decision operator.

Such a decision operator is designed, in accordance with the invention, to decide whether, for example, a component in a material processing and/or production process (or the like) or the processing and/or production apparatus is OK or not OK. The decision operator has an input for a fault pattern recognition operator, an input for an event pattern recognition operator (8) and/or an input for a free pattern operator (9), possibly also a plurality of inputs for example for a plurality of event pattern recognition operators, and/or a plurality of inputs for example for a plurality of free pattern recognition operators. An internal logic and internal parameters for the parameterisable and/or programmable linking of the input data, and an output for an OK or not-OK signal, are provided expediently.

The decision operator may comprise a multi-dimensional decision field, in particular two-, three-, four- or five-dimensional decision field, in particular with one or more assignment region(s).

The decision operator can have a plurality of, in particular two, three or four, decision fields, each with at least one borderline that is variable in time.

In addition to decision operator(s) and/or pattern recognition operator(s), further operators are expediently provided for communication with the outside world, in the industrial environment with machine controllers, or higher-level data systems.

A pattern recognition operator according to the invention may have an input for a data stream and an output for a data stream and/or value corresponding to a measure of agreement with a pattern from a plurality of patterns of a pattern database.

The pattern recognition operator expediently identifies event patterns and/or fault patterns, in particular on the basis of a parameterisation, a decision field and/or a pattern recognition.

The pattern recognition operator expediently has a two-, three- or multi-dimensional characteristic map with one or more assignment regions.

A plurality of operators form an operator network according to the invention, comprising one, two or more pattern recognition operators (7, 8), possibly one or more free pattern operators (9) and at least one decision operator (6), and/or further operators. The operator network can have a notification operator, a machine control operator and/or a difference operator (35).

A plurality of operators, in particular pattern operators, can be arranged in parallel or cascading form in the operator network.

An expediently provided multiple data transformation allows for the step-by-step processing of data up to two- or multi-dimensional graphs, single values and yes/no decisions. Thus, by applying the operator programming and possibly the use of different external sensors, completely different measurement instruments are created, simply by implementing the different analysis algorithms, which are inserted into the operator networks by means of drag and drop.

Once found, parameterisations of individual operators, which can be very complex as in the case of pattern searching or decision searching, are advantageously stored as template parameterisations and can be reused in other measurement contexts.

Complete operator networks can also be stored as template networks and are available as a basis for similar or extended measurement systems. The operator networks can be executed on all compatible hardware systems (measuring instruments) and thus represent a general analysis layer up to the graphical representation of usable measuring instrument programming.

The operators are connected to connection points, also called connections, which transport the processed data between the individual operators.

These connections can also be parameterised as buffers with pipeline function. They thus ensure an asynchronous processing of the data, which is necessary particularly when transitioning between different operators or data streams that operate at different speeds.

The connections are therefore also able to connect distributed operator networks, which are connected on different hardware, via Internet, to industrial bus systems or otherwise, to form a complex analysis network.

Mobile devices that support the operators according to the invention can become part of an integrated operator network, either as a sensor or as a display module.

The invention therefore provides mobile, in particular independently powered devices, in particular in the form of a sensor or display module, which are designed as an operator with an input and/or output data stream for embedding in an operator network or in a measuring device. The communication takes place in the known manner in wired or wireless fashion via a standard protocol such as TCP/IP or the like.

The invention thus creates methods and devices, for example the measuring instrument, for identifying events in a material processing and/or production process on the basis of a multi-dimensional data stream obtained during the process (for example originating from a structure-borne sound sensor or other mentioned sensors) with time-resolved frequency and energy information using fault and/or event patterns and/or energy data, the data passing through one or more pattern operators arranged in parallel or one after the other and being fed to one or more decision operators arranged in parallel or one after the other.

The invention further provides a graphical user interface for creating and/or editing an operator network according to the invention, and/or a measuring device comprising the graphical user interface, the possibility of graphical positioning and linking of predefined operators being enabled.

In a device according to the invention for carrying out the method, an operator network and/or a graphical user interface are provided for creating and/or editing the operator network.

Further features and embodiments will become clear from the following description of exemplary embodiments of the invention.

Aspects of the invention are described below with reference to embodiments illustrated in the accompanying drawings.

DETAIL DESCRIPTION OF DISCLOSURE

Figure 2:
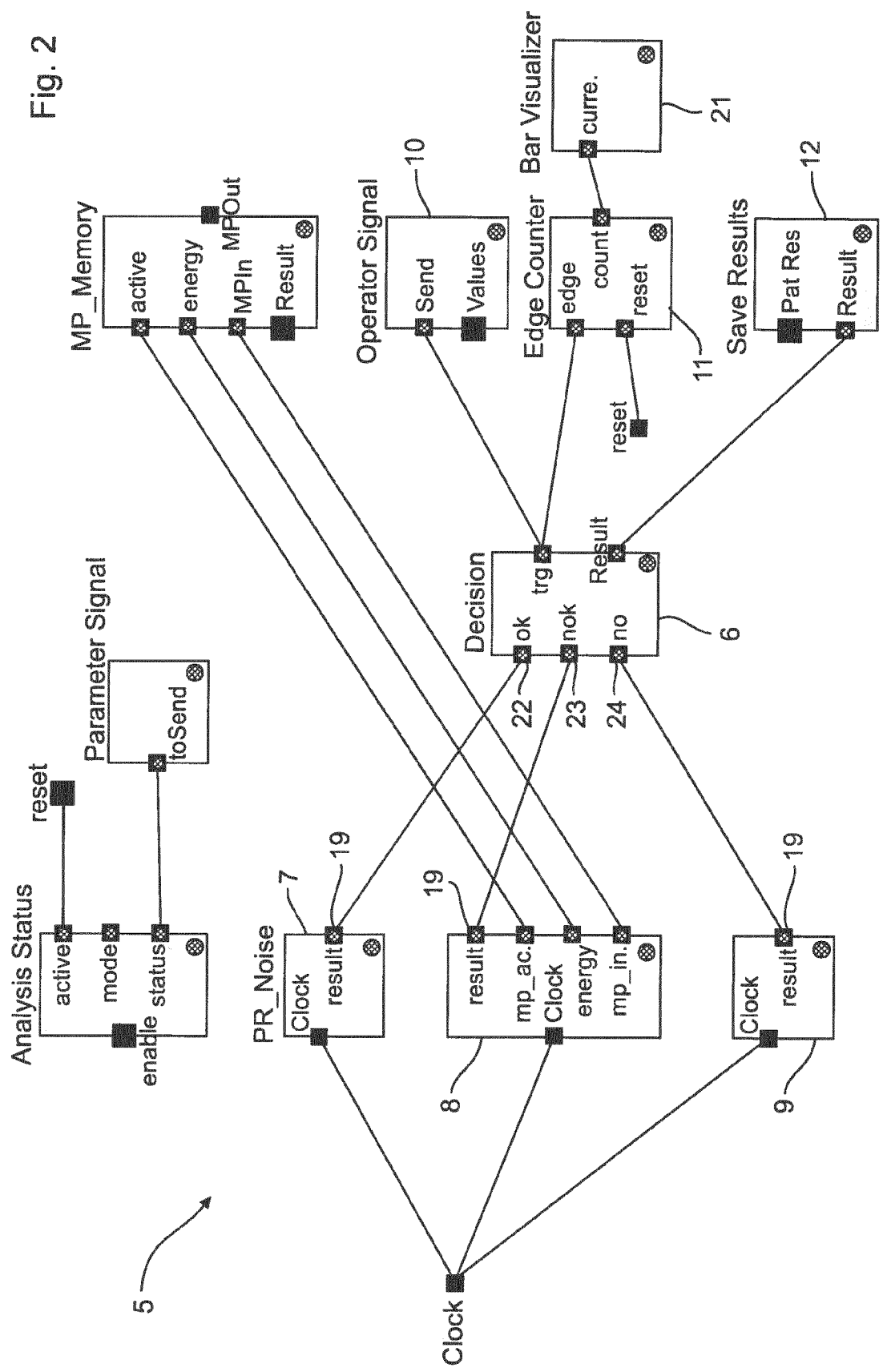
FIG. 2 illustrates an operator network in accordance with the present disclosure.

An operator network 5 according to the invention is shown in FIG. 2 in an exemplary configuration. It comprises a decision operator 6, which here is connected on the input side to a fault pattern operator 7, an event pattern operator 8 and/or a free pattern operator 9 and on the output side to a signal operator 10, a counting operator 11 and/or a memory operator 12.

Each operator is a program module with predefined input and/or output interfaces and internal logic, for filtering data, collecting data, processing data, making decisions, storing data, interacting with computers, databases, users and/or the like, and/or activating devices such as signals, motors, shutdown devices and/or the like, etc.

Figure 3:
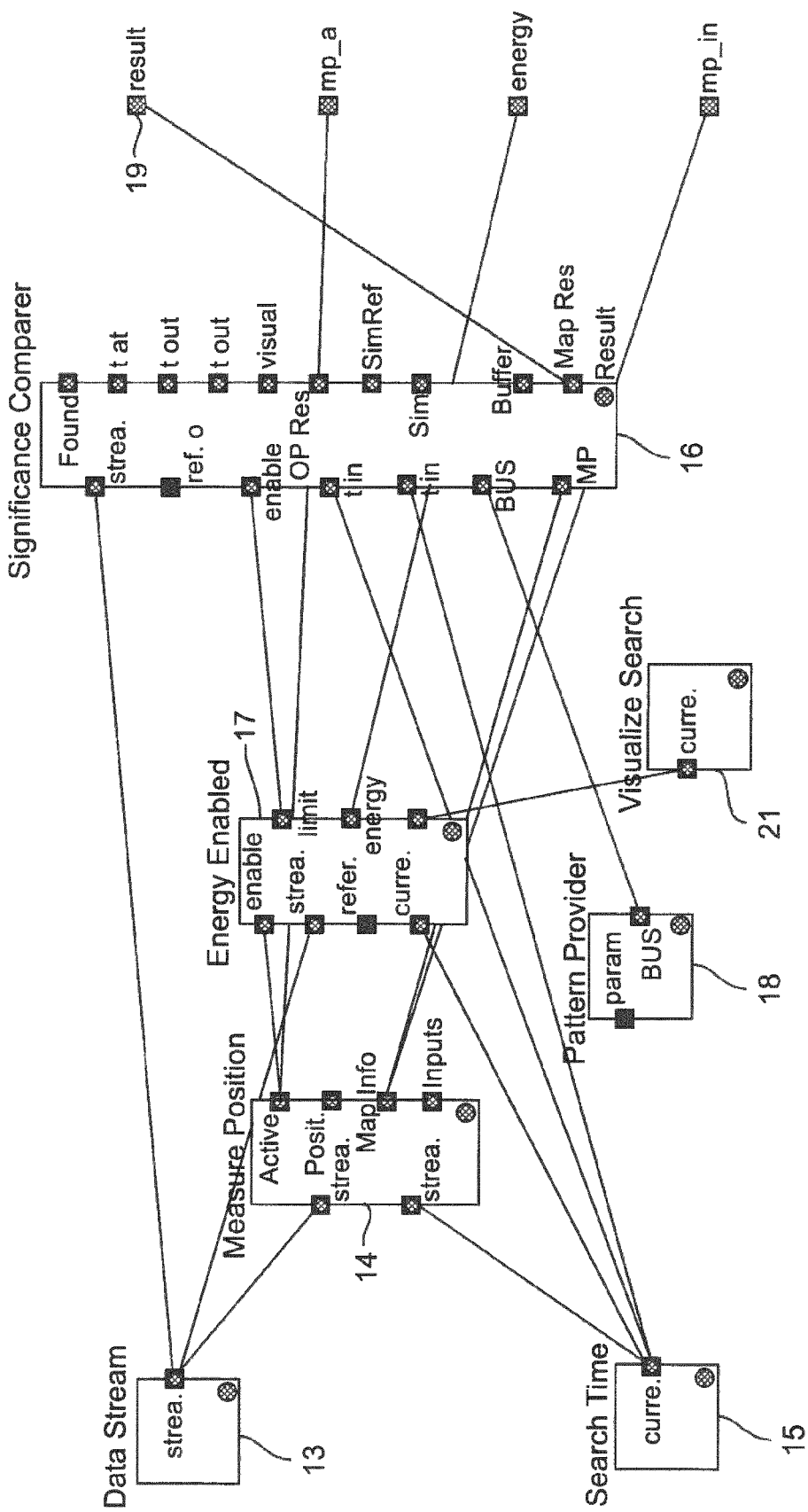
FIG. 3 illustrates a fault pattern operator in accordance with the present disclosure.

The fault pattern operator 7 shown here can be constructed as shown in FIG. 3. A data stream 13, for example as a raw data stream of a sensor, in particular a sound signal sensor, or as a data stream processed by in particular other operators, for example as a frequency-filtered and/or smoothed data stream, is passed to a position determination operator 14 which, taking into account a process time provided by a time operator 15, to determine the temporal position of the data within the process and feeds it to a pattern comparison operator 16. An energy determination operator 17 is also connected to the operators 13, 15, to determine the energy in the data stream, for example in the form of the sound intensity, and correlates this with the process time in order to feed the result to the pattern comparison operator 16. Using these two input data streams and, if necessary, as shown, the data stream from the data stream operator 13, the time component from the time operator 15 and/or pattern data from a pattern operator 18, which is advantageously connected to a pattern database or can otherwise retrieve patterns for events, the pattern comparison operator 16 determines a measure of the agreement between the data supplied by the data stream operator 13 and a pattern supplied by the pattern operator 18, or a number of measures for a number of patterns. For example, the measure may be a number between 0% and 100% or between 0 and 255 or the like. The level of agreement is provided at the result output 19.

The pattern operator 18 accesses fault patterns as occur during the process, such as the impact of the punch on the component to be straightened, a humming noise due to vibrations of the straightening device, ambient influences such as knocking by operating personnel, grinding noises of the tool on the workpiece, etc. At the result output 19, for example, a probability of 67% can be output for the identification of a fault pattern.

The event pattern operator 8 can be structured in substantially the same way as the fault pattern operator 7. Thus, its logic may also include a data current operator, a time operator, a position determination operator, an energy determination operator, a pattern comparison operator and/or a pattern operator, which may be similarly or identically connected and internally configured with weighting factors and the like, the pattern operator accessing event patterns from a pattern library representing faults, such as patterns for stress cracks or tool breakage during machining and the like. The event pattern operator 8 provides, at its result output 19, see FIG. 2, a value indicating that such an event has occurred, for example 82%.

Figure 4:
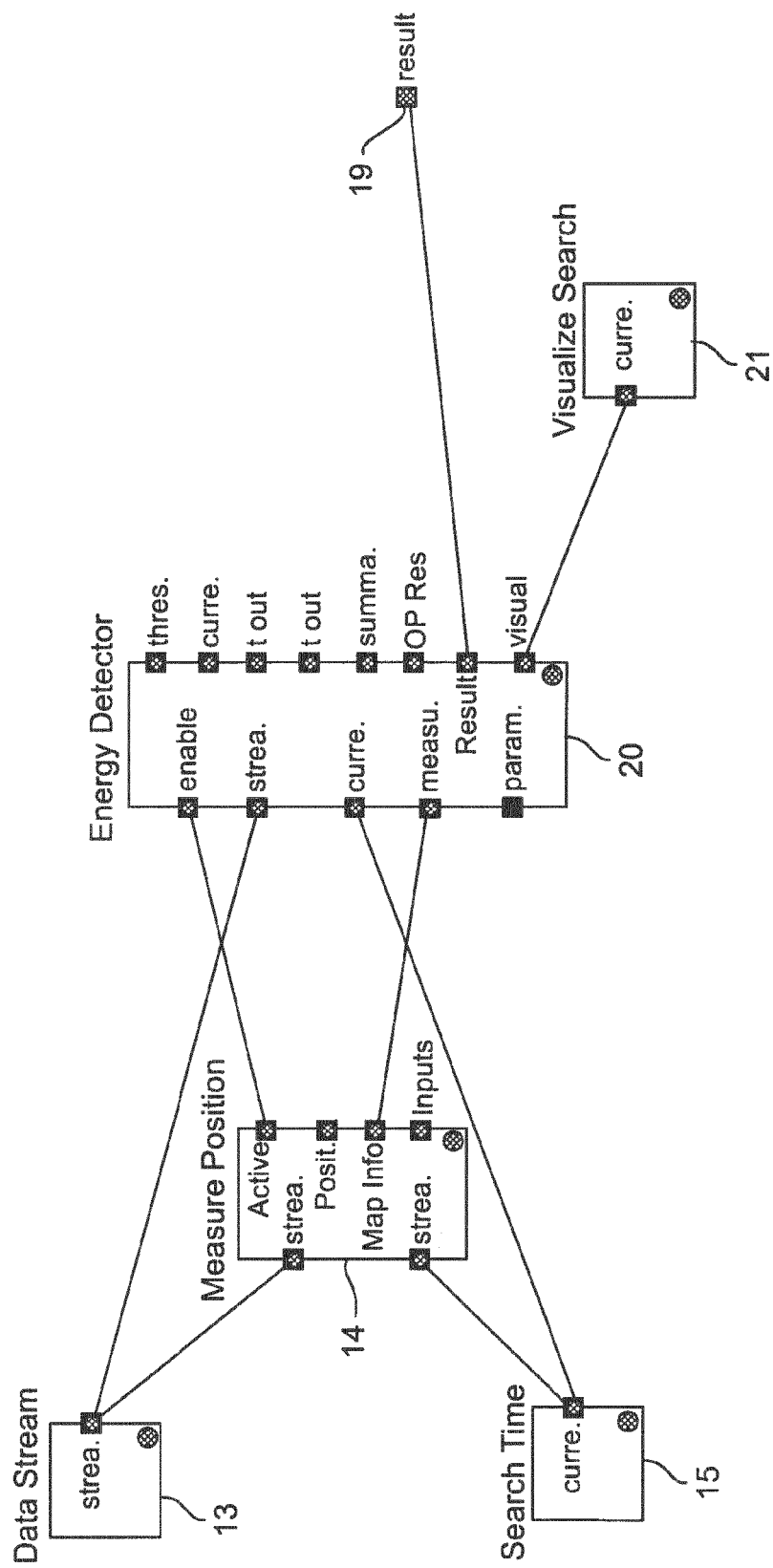
FIG. 4 illustrates a free pattern operator that can have, in addition to a data stream operator, a time operator and a position determination operator as shown in FIG. 3.

As shown in FIG. 4, the free pattern operator 9 can have, in addition to a data stream operator 13, a time operator 15 and a position determination operator 14 as shown in FIG. 3, an energy determination operator 20, which calculates, for example, the energy, such as the sound signal intensity, and/or duration, and provides it at its result output 19. No pattern recognition takes place here, but instead the analysis of the energy.

The processes and/or results can be displayed on a screen or the like by means of visualization operators 21.

According to the invention, the operators can be arranged and configured in a graphical user interface. Thus, they can be dragged and dropped with the mouse or the like from a list of operators and arranged on a worksheet. Data connections between the inputs and outputs illustrated as lines in FIGS. 2, 3 and 4 are also graphically configurable. By right clicking or the like on an operator, its internal parameters or logic can be selected and/or changed. For example, in the energy determination operator 20, the formula for calculating the energy value can be determined, in the pattern comparison operator 16, the algorithm can be selected to determine the level of agreement between the acquired data and a pattern (for example by adding up the differences or the like), etc.

The graphical user interface enables the user to implement, adapt and maintain an operator network individually tailored to the particular process, quickly and flexibly without having to rely on the manufacturer or on programmers.

The decision operator 6 is of particular importance in the configuration insofar as it enables discrimination in a reliable manner for components/workpieces that are free of faults (OK) or faulty (not OK, NOK).

In the example shown in FIG. 2, OK, NOK and NO inputs 22, 23, 24 of the decision operator 6 are connected to the result outputs 19 of the operators 7, 8, and 9.

At the OK input 22, the fault pattern operator 7 provides a (probability) value together with further information that an insignificant interfering signal is currently being detected, i.e. the workpiece is "OK". At the NOK input 23, the event pattern operator 8 provides a (probability) value and further information that a significant event such as a stress crack is currently being detected, i.e. the workpiece is not OK ("NOK"). The NO input 24 provides further information without pattern comparison ("NO" pattern recognition). The further information can include an energy value, such as the sound intensity and/or a duration, such as the time duration of the energy from exceeding a threshold value until it falls below the threshold value, or similar.

In accordance with the invention, the decision operator 6 is configured to contain multi-dimensional decision fields in cascading form and, in the basis of the result of the cascaded multi-dimensional decision, sends a trigger signal to the signal operator 10 to mark a workpiece as faulty (or possibly free of faults) so that a faulty workpiece can be rejected. Likewise, the results and/or data can be stored by passing them on to the memory operator 12, and the rejection per time unit or in total can be recorded via the counting operator 11 and displayed at the visualisation operator 21, for example in the form of a scale, in order to visualize trends.

Figure 1:
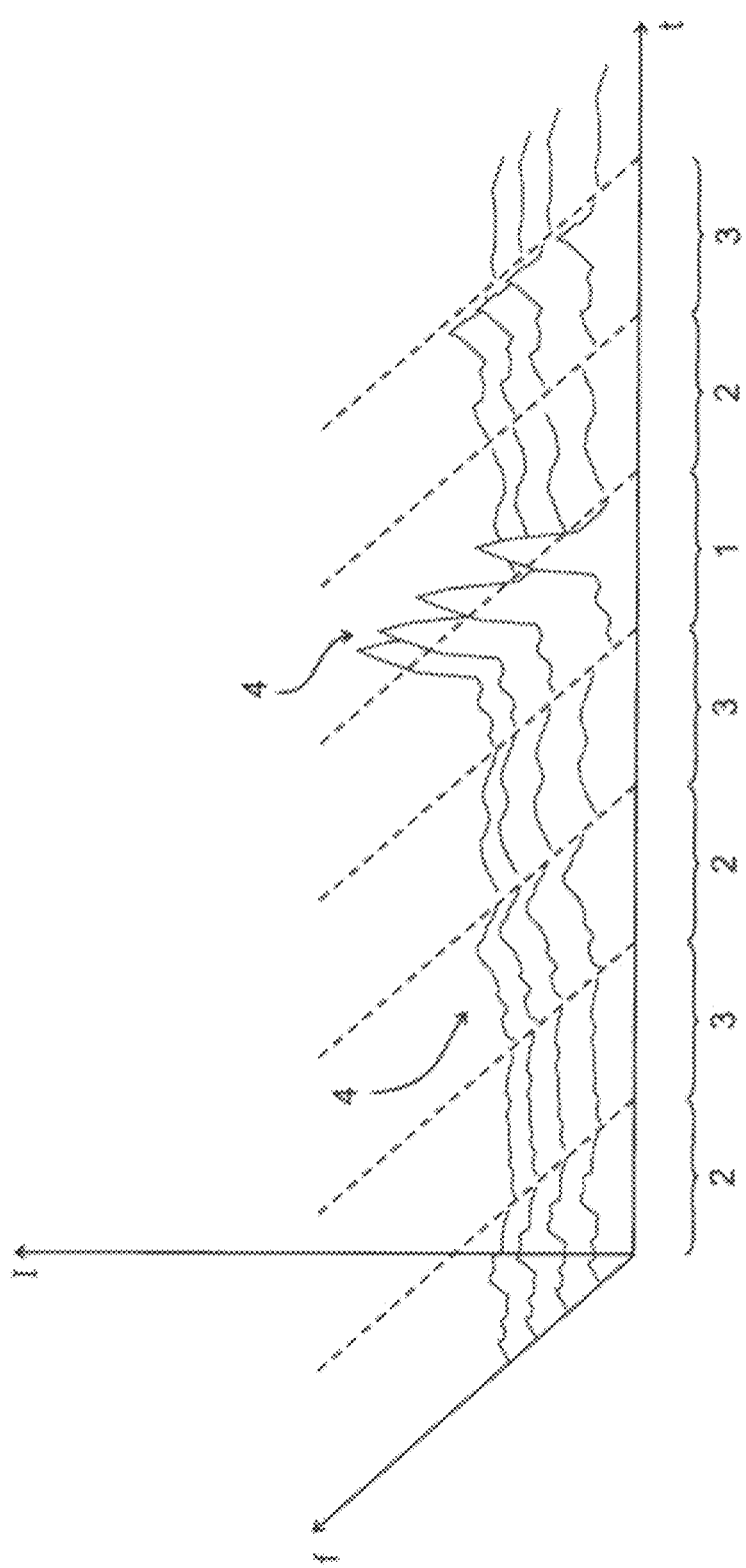
FIG. 1 illustrates a prior art 1 the data stream recorded as a function of time t, frequency f and intensity I used to evaluate a cutting process.
Figure 5:
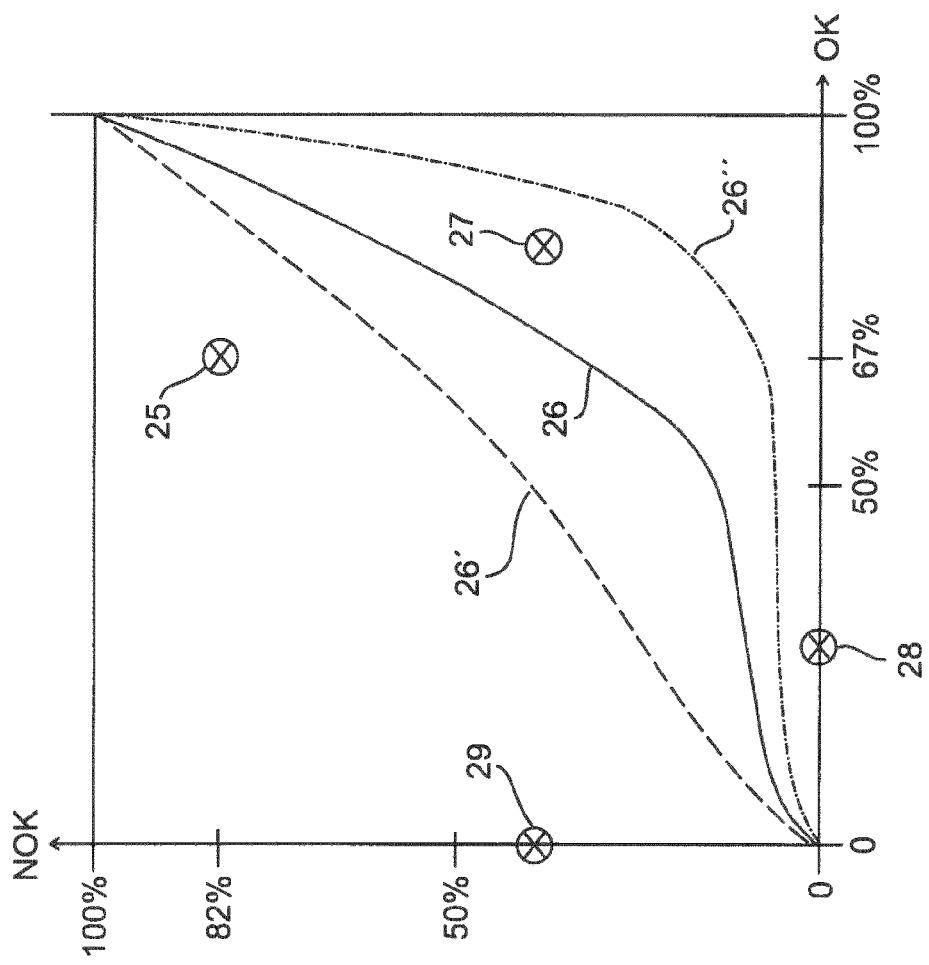
FIG. 5 illustrates a first multi-dimensional decision field in accordance with the present disclosure.

The first multi-dimensional decision field is illustrated in FIG. 5. It compares the OK value from the fault operator 7 and the NOK value from the event pattern operator 8. In the above example, an OK value of 67% and an NOK value of 82% have been determined for stress phase 1 in FIG. 1. This corresponds to data point 25, which is above a boundary line 26 configurable via the graphical user interface. A further data point 27 is below the boundary line 26. Data points 25, 26 are ambiguous assignments, i.e. the events could very likely be either an insignificant interfering signal or a significant event pattern signal, while further data points 28, 29 are less ambiguous because they are either 0% NOK or 0% OK.

The boundary line 26 serves here as the first step of discrimination. For the next stage, the ambiguous data points are fed into a multi-dimensional NOK decision field according to FIG. 6, a multi-dimensional OK decision field according to FIG. 7, and/or a multi-dimensional NO decision field according to FIG. 8.]

Figure 6:
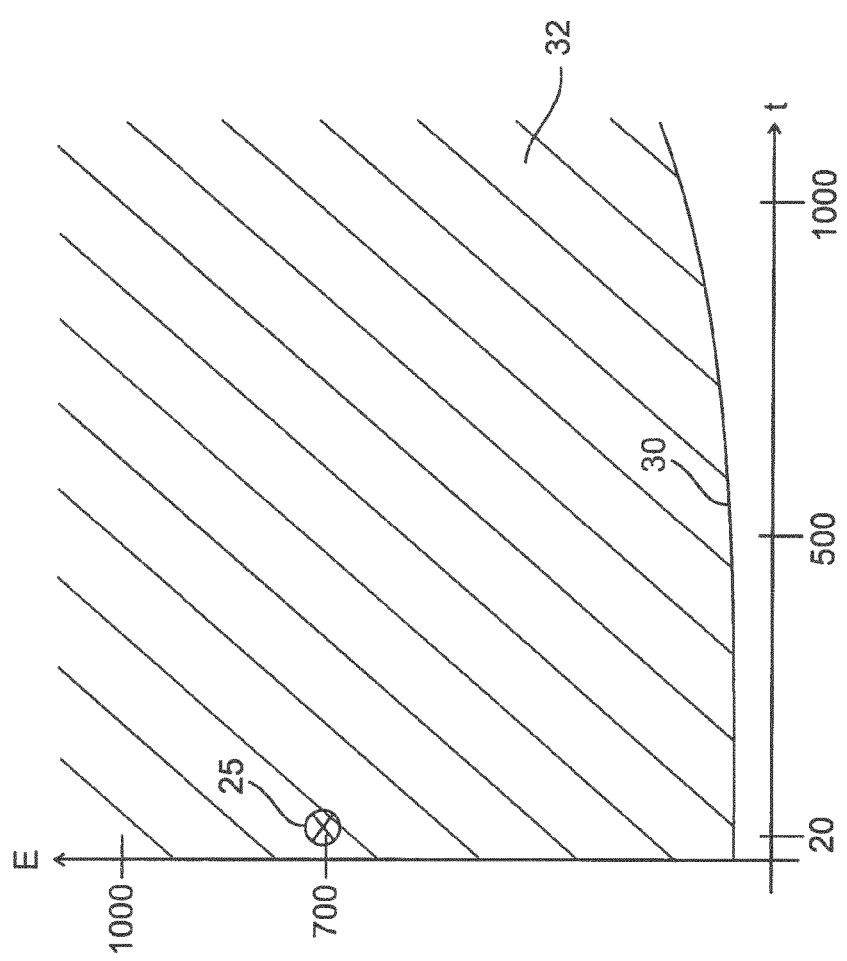
FIG. 6 illustrates a multi-dimensional NOK decision field in accordance with the present disclosure.
Figure 7:
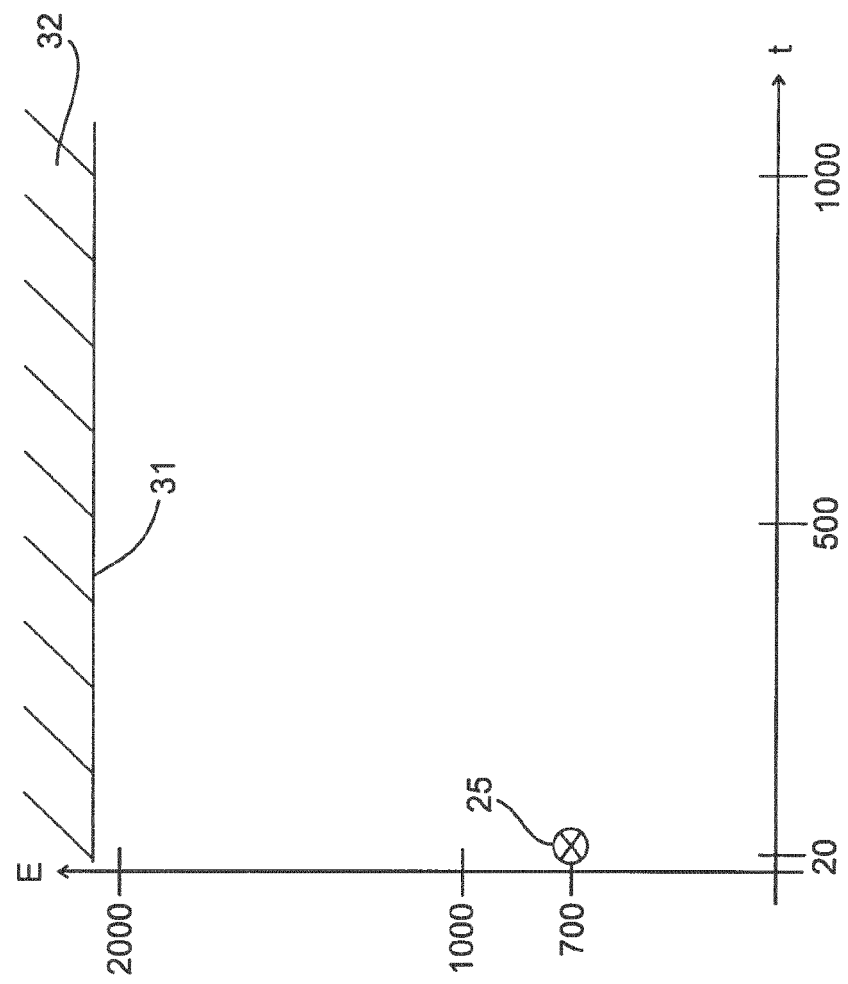
FIG. 7 illustrates a multi-dimensional OK decision field in accordance with the present disclosure.
Figure 8:
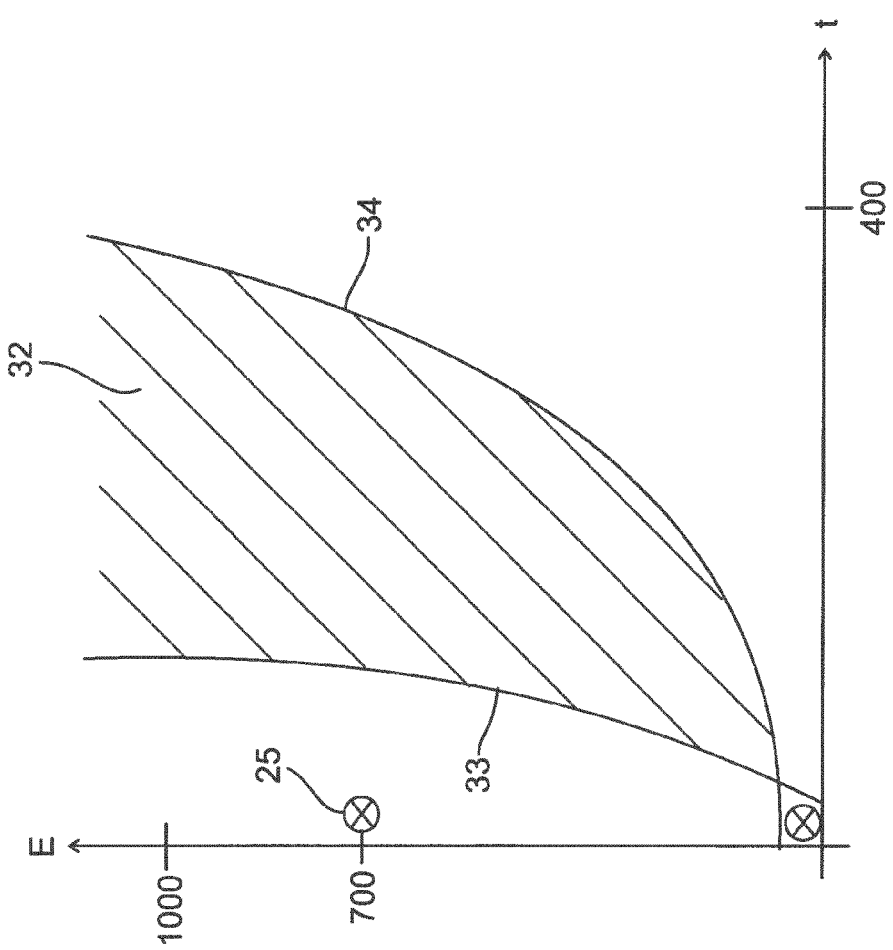
FIG. 8 illustrates a multi-dimensional NO decision field in accordance with the present disclosure.

Data point 25 is thus plotted with its further data, here, by way of example, in relation to energy and duration, and is located above an NOK boundary line 30 in FIG. 6, below an OK boundary line 31 in FIG. 7, and outside the hatched NOK range 32 between the NO boundary lines 33, 34 in FIG. 8. In further embodiments, a decision field of two or more dimensions can include the parameters energy, duration, temporal position, counter, temporal scaling, amplitude scaling and the like and/or, instead of a boundary line, a boundary surface can be used.

The decision operator 6 is expediently configured to evaluate the data point 25 as NOK, since the data point 25 is in the NOK range 32 with regard to any two of the three operators OK, NOK and NO.

The boundary lines 26, 30, 31, 33, 34 can be individually adapted to the particular process.

Another dimension in FIGS. 5, 6, 7 and 8 can be time. It is therefore expedient to set the boundary lines 26, 30, 31, 33, 34 depending on the time in the process. For example, at the beginning of each stress phase 1, 3 the force exerted on the workpiece during bending and straightening and thus the probability of breakage is low, whereas at the end of the stress phases 1, 3 it is maximum. Thus, it may be expedient to set, at the beginning of the stress phase, a boundary line 26' which is more generous than the boundary line 26, while at the end of the stress phase a boundary line 26" is set, at which an NOK event is assumed earlier due to the high force acting (see FIG. 5). A data point 27 can therefore be OK if it is recorded at the beginning of the stress phase, while at the end it is above the boundary line 26" and NOK. The temporal course between the boundary line 26' at t=start of stress phase at 0 ms over the boundary line 26 to the boundary line 26" at t=end of stress phase at, for example, 1000 ms can be set arbitrarily, for example linearly.

The above-mentioned operators can be cascaded and/or arranged in parallel, as desired.

Figure 9:
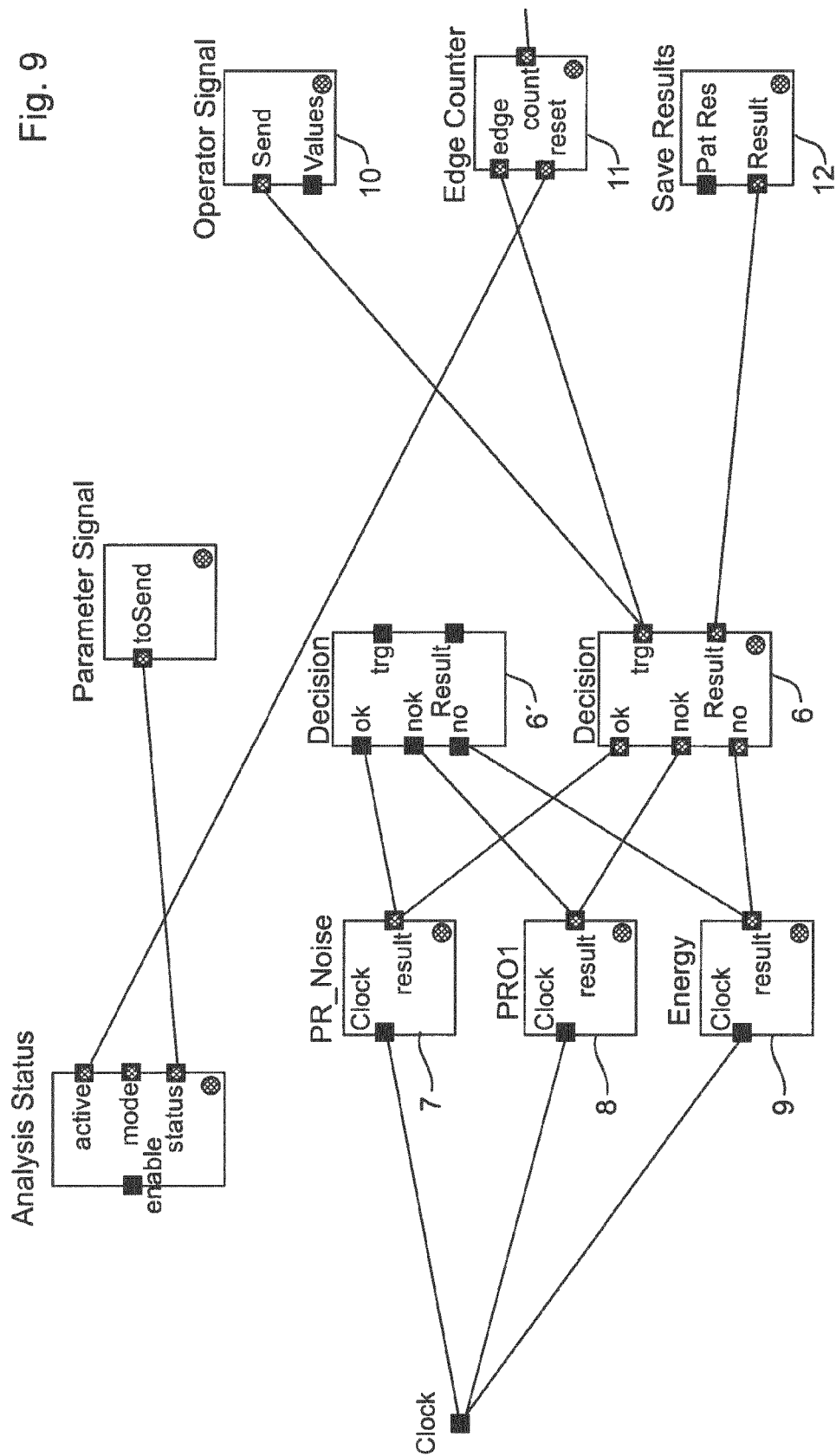
FIG. 9 illustrates a decision operator which monitors the maintenance condition of the bending device.

It may therefore be expedient to provide a further decision operator 6', see FIG. 9, which monitors the maintenance condition of the bending device. Here, patterns for events can thus be evaluated differently, for example a data point in FIG. 7 with high energy and long duration can indicate a problem with the machine and it may be provided to stop the machine.

Further operators can be provided, for example a notification operator, which automatically sends an e-mail or other message with relevant information to the maintenance service and/or the person responsible for the process.

Figure 10:
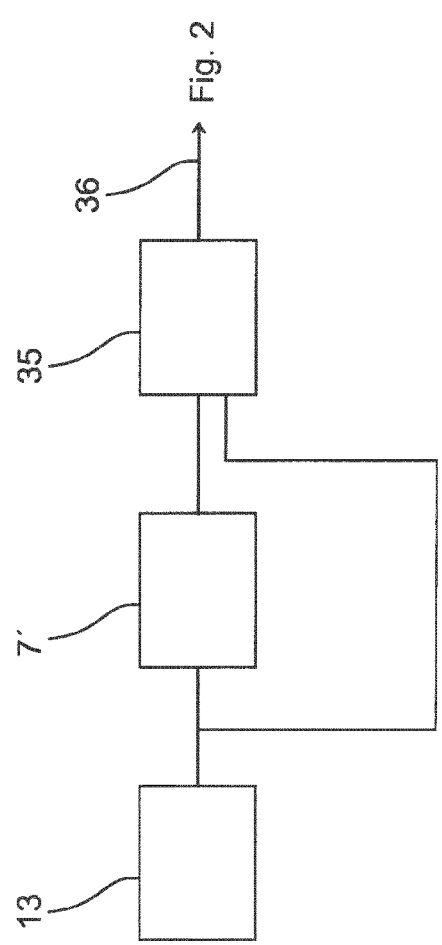
FIG. 10 illustrates a non-limiting configuration for a difference operator in accordance with the present disclosure.

In a further embodiment, a difference operator can be provided. The difference operator is configured in such a way that it identifies a known pattern, for example a more or less constant background noise or a recurring interfering noise or other fault data, adapts the associated pattern as precisely as possible to the magnitude of the data stream, and subtracts it if there is sufficient agreement. Then, a cleaned data stream remains as the difference, which can be fed to the other operators. A possible arrangement is illustrated in FIG. 10, in which a difference operator 35 is connected downstream of the fault pattern operator 7' and extracts fault patterns from the data stream 13 on the basis of the fault pattern identification and feeds the cleaned data stream 36 to further processing, for example as input data stream in FIG. 2 for the operators 7, 8, 9, wherein the subsequent operator 7—if present—can be set differently, or the fault pattern operator 7 only identifies certain fault patterns, such as ripples, scatter, etc.

In the following, the operator model according to the invention is explained by means of further examples. In particular, it can be executed on distributed, heterogeneous and asynchronously working information technology hardware and systems.

Analyses are carried out in the measuring instrument according to the invention by a network of operators.

At the beginning, there is an operator that enables access to input data.

A measurement data stream coming from an external source can sample sensor data over channels with up to 100 M samples and 16 bit or 4 Ms and 24 bit and can calculate in real-time an FFT with 25000 spectra/s per channel and provide both as input data stream.

32 digital IOs for machine control and Profibus and Profinet for machine communication can also be provided as inputs and outputs for the operators.

Figure 11:
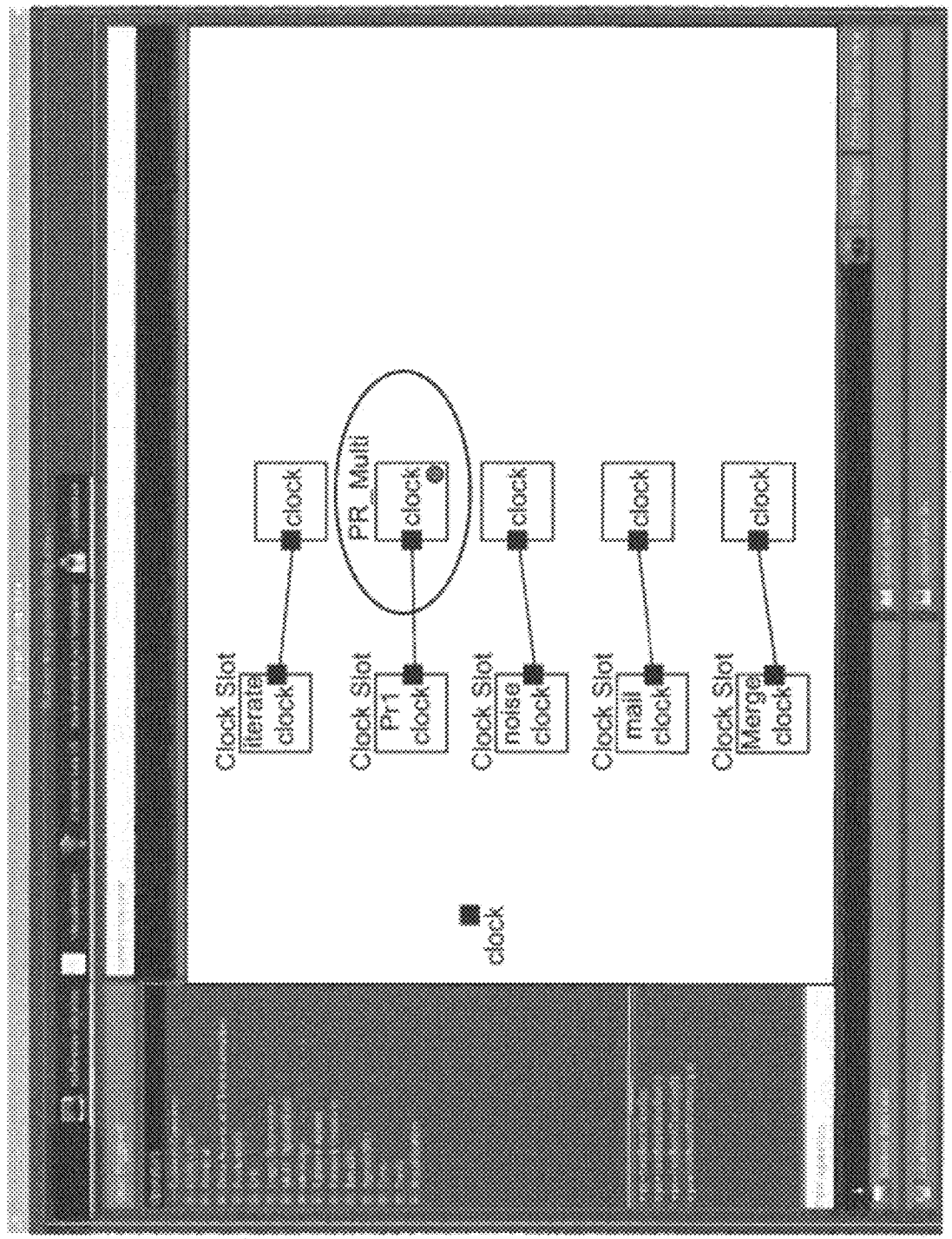
FIG. 11 illustrates a non-limiting example of analysis sequences that are created in the graphical operator editor in accordance with the present disclosure.

The analysis sequences are created in the graphical operator editor according to the invention, see FIG. 11 as an example.

At the top level, processors (clock slot) execute analysis programs (custom operators).

Figure 12:
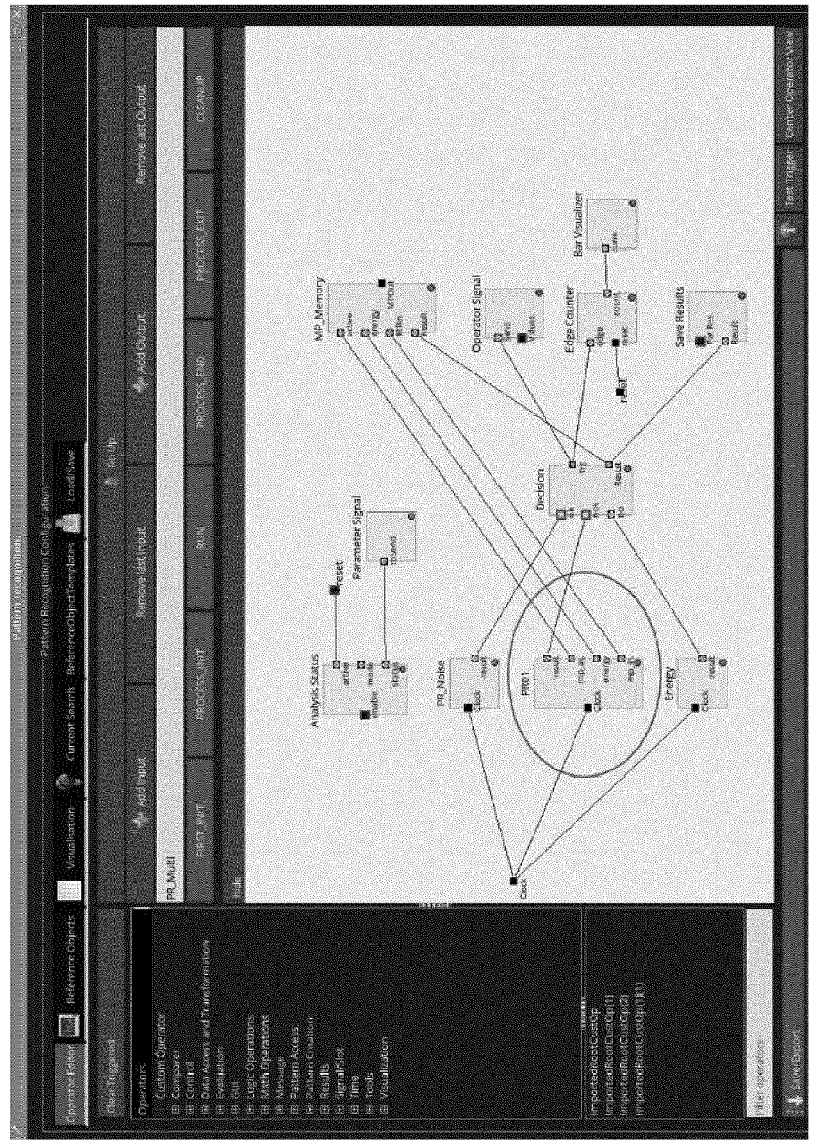
FIG. 12 illustrates a non-limiting example of a network for pattern analysis and decision making in accordance with the present disclosure.

Custom operators represent containers for subprograms, in which complex networks of further subprograms and prefabricated operators can be implemented; see FIG. 12, which shows an example of a network for pattern analysis and decision making.

Figure 13:
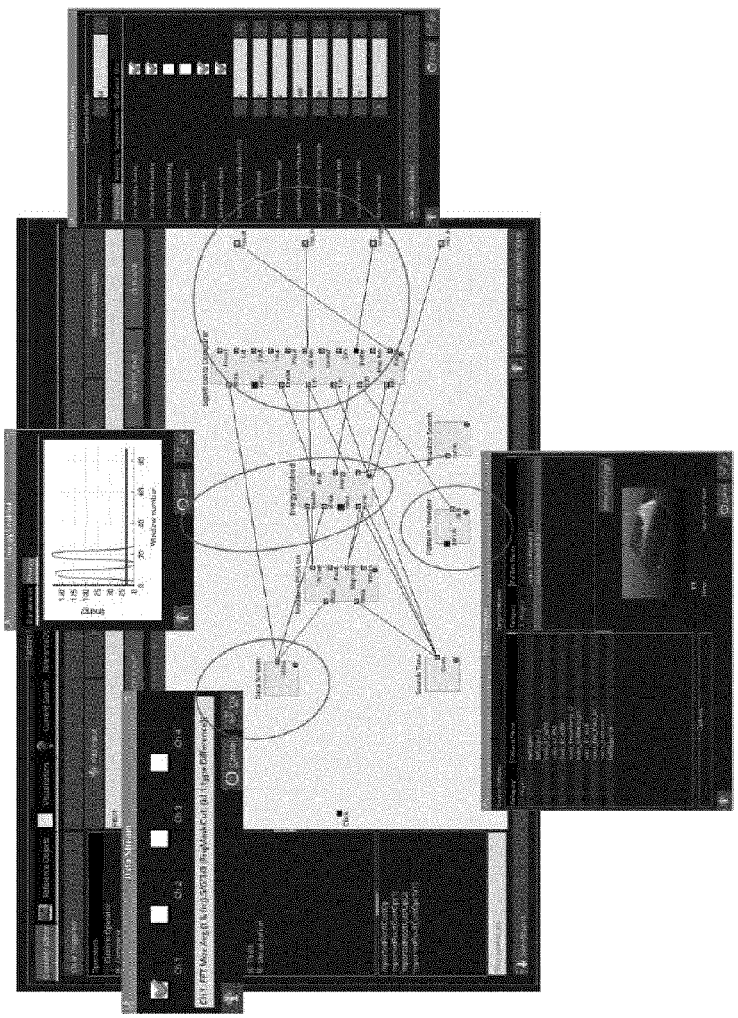
FIG. 13 illustrates a network that combines data stream, filter components and pattern comparison operation in accordance with the present disclosure.

On the next level, a network is visible that combines data stream, filter components and pattern comparison operations; see FIG. 13.

In the editor, the individual operators present more or less complex GUI components that define the connection to the data and parameterise the way the operators work.

Via the connections, data is exchanged in the form of some basic types, Bool, Number, int64 etc., and more complex data for example in the form of JSON objects.

JSON objects are also exchanged with the GUI for parameterisation.

New operators can be integrated via plugin.

A new data source must therefore include, above all, an operator plugin.

In the real-time measurement process, the data are processed by the operators and, as shown in this example, the best fitting pattern is found, scaled, and its counterpart in the data stream is analyzed.

At the same time, an evaluation is made according to the needs of the process, and a decision is made, for example, with regard to the quality of the workpiece or the performance of a production process.

Figure 14:
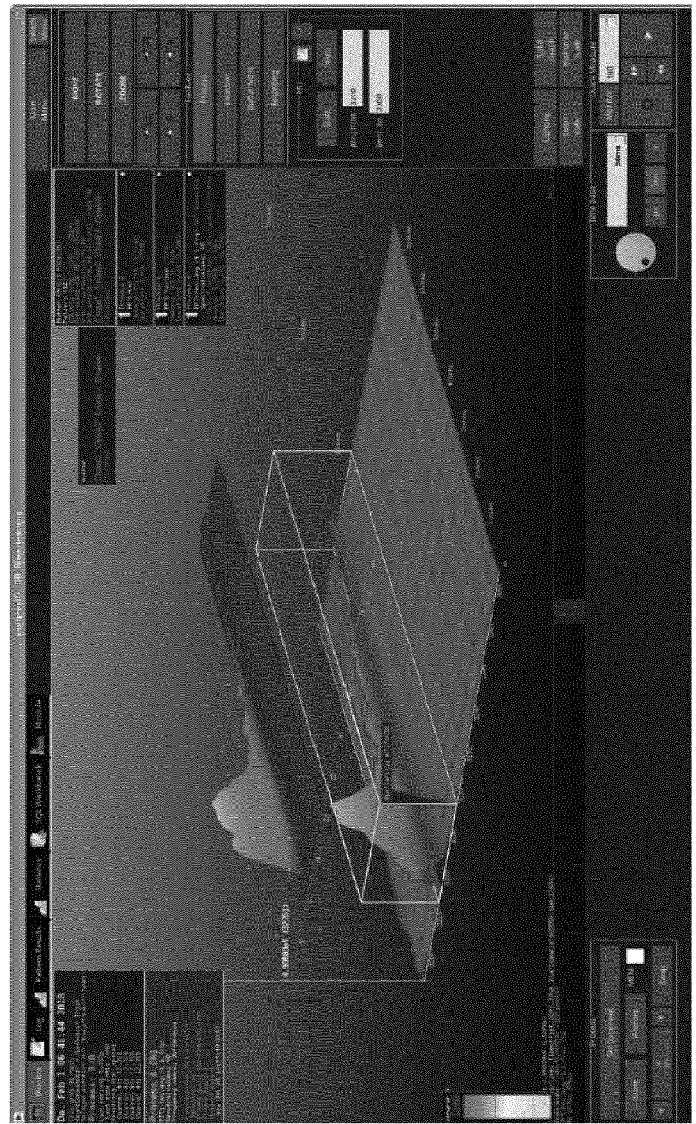
FIG. 14 illustrates the detection of a micro-crack in a gear shaft.

In FIG. 14, for example, a micro-crack in a gear shaft is detected. A 50 ms long section of structure-borne sound data from an industrial straightening machine for gear shafts is shown. The landscape is created on the basis of 25000 spectra/s after FFT of the microphone data, which in this case are evaluated up to approx. 800 kHz.

All data can be stored on measuring devices in RAW format and in various compressions and can be analysed both in real time as well as after process (for learning processes).

Examples for sensors according to the invention are, among others, structure-borne sound microphones and magnetic sensors, as well as broadband analogue amplifiers (>100 MHz) for data acquisition in industrial processes.

The operator concept can be extended to distributed, heterogeneous and asynchronously operating information technology hardware and systems. Individual sections of a large operator network can run on distributed systems.

The sensors according to the invention can collect and pre-process data, i.e. they can be designed as smart sensors.

A real-time processing system can perform spectral analysis and identify patterns. A PC makes complex decisions. The hardware and software used can be very different. As long as the interfaces of the operator system are supported, any device, for any service can be integrated into the overall processing.

In addition to the actual device, the manufacturer of a device, a smart sensor, also provides a module for operator integration with a GUI for carrying out the parameterisation and making the inputs and outputs available to the other participants in the network.

The data streams can be both analogue and digital and can be transported on different carriers and also support different protocols, their respective operators providing access to the data in compatible form.

In all embodiments, learning phases can be provided in which the sensors can transmit large amounts of data; learning is slow. Analysis networks can be created and parameterised on the basis of the learning data. Parts of the operations are then carried out in the sensor itself, data is already pre-processed and evaluated and, in the best case, results are already transmitted.

Systems with wireless power supply and wireless communication can be completely sealed and thus built up in a process-safe way, their use can be maintenance-free.

For network integration, an OS (for example Linux system) with TCP/IP connectivity can run on each sensor. Alternatively, a sensor hub can be provided, which contains the OS system and brings the sensor into the network. The forwarding can be wireless or wired.

For the supply of wireless components such as sensors, in accordance with the invention methods of energy harvesting and wireless energy transmission are preferably used in addition to battery supply.

If the data are mainly provided by the sensor system via TCP/IP, an FPGA-based smart-switch, for example, can advantageously represent a collection point and further processing stage. This smart-switch carries out parallel computing on the connected data streams and then makes its results available again via TCP/IP or also via PCIe, USB, etc.

LIST OF REFERENCE SIGNS

1 Stress phase
2 Stress phase
3 Relief phase
4 Landscape
5 Operator network
6, 6' Decision operator
7 Fault pattern operator (Pattern recognition operator)
8 Event pattern operator (Pattern recognition operator)
9 Free pattern operator
10 Signal operator
11 Counting operator
12 Memory operator
13 Data stream operator
14 Position determination operator
15 Time operator
16 Pattern comparison operator
17 Energy determination operator
18 Pattern Operator
19 Result output 20 Energy determination operator
21 Visualisation operator
22 OK input
23 NOK input
24 NO input
25 Data point
26, 26', 26" Boundary line
27 Data point
28 Data point
29 Data point
30 NOK boundary line
31 OK boundary line
32 NOK range
33 NO boundary line
34 NO boundary line
35 Notification operator, Machine control operator and/or Difference operator
36 Data stream
37 Graphical user interface

The invention claimed is:

1. A measuring device comprising a sensor for high-frequency detection of a measurand, such as sound, structure-borne sound, current, voltage, optical or magnetic measurement values and the like, characterized by an operator network according to one of the following claims with at least one operator that includes one or more of a) decision operator for deciding whether a component in a material processing and/or production process or in a processing and/or production device is OK or not OK, and wherein said decision operator having an input for a fault pattern recognition operator, an input for an event pattern recognition operator and/or an input for a free pattern operator, and wherein said decision operator has internal logic and internal parameters for parameterisable and/or programmable linking of the input data, and having an output for an OK or not OK signal, and wherein said decision operator includes a two- or three-dimensional decision field; and/or b) a pattern comparison operator having an input port to receive an input data stream and an output port to output an output data stream and/or value corresponding to a measure of an agreement between a pattern in the input data stream and one of a plurality of patterns from a pattern database, and wherein the pattern comparison operator comprises a two-, three- or multi-dimensional characteristic map with one or more assignment regions.

2. An operator network comprising one, two or more pattern recognition operators, optionally a free pattern operator and at least one decision operator according to claim 1.

3. The operator network according to claim 2, characterized by a visualization operator, a machine control operator and/or a difference operator.

4. The operator network according to claim 2, characterized in that a plurality of operators, in particular pattern operators, are arranged in parallel or cascading form.

5. A mobile device, in particular with independent power supply, in particular a sensor or display module, characterized by being designed as an operator with an input and/or output data stream for embedding in the operator network or in the measuring device according to claim 1.

6. A device for identifying events in a material processing and/or production process on the basis of a multi-dimensional data stream obtained during the process with time-resolved frequency and energy information, using fault and/or event patterns and/or energy data, characterized in that the data pass through one pattern operator or a plurality of pattern operators arranged in parallel or in succession and are supplied to one decision operator or a plurality of decision operators arranged in parallel or in succession according to claim 1.

7. A graphical user interface for creating and/or editing a network of operators, and/or a measuring device comprising a graphical user interface, characterized by graphical positioning and linking of the operators according to claim 1.

8. A method for creating and/or editing the operator network according to claim 1.

9. A decision operator for deciding whether a component in a material processing and/or production process or the processing and/or production device is OK or not OK; said decision operator having an input for a fault pattern recognition operator, an input for an event pattern recognition operator and/or an input for a free pattern operator; said decision operator having internal logic and internal parameters for parameterisable and/or programmable linking of the input data, and having an output for an OK or not OK signal; said decision operator includes a two- or three-dimensional decision field.

10. The decision operator according to claim 9, characterized by three decision fields each having at least one temporally variable boundary line.

11. A measuring device comprising a sensor for high-frequency detection of a measurand, such as sound, structure-borne sound, current, voltage, optical or magnetic measurement values and the like, characterized by an operator network, said operator network includes a pattern comparison operator having an input port to receive an input data stream and an output port to output an output data stream and/or value corresponding to a measure of an agreement between a pattern in the input data stream and one of a plurality of patterns from a pattern database; the pattern comparison operator comprises a two-, three- or multi-dimensional characteristic map with one or more assignment regions.

12. The measuring device according to claim 11, characterized in that the pattern comparison operator identifies event patterns and/or fault patterns.

13. A measuring device for identifying events in a material processing or production process; said measuring device comprising a sensor for high-frequency detection of a measurand and an operator network; said measurand includes one or more properties selected from the group consisting of sound, structure-borne sound, current, voltage, optical measurement values and magnetic measurement values; said operator network includes one or more of I) a decision operator configured to determine whether a component in a material processing and/or production process or in a processing and/or production device is OK or not OK, and wherein said decision operator has an input for 1) a fault pattern recognition operator, i1) an input for an event pattern recognition operator and/or ii1) an input for a free pattern operator, and wherein said decision operator has a) internal logic and internal parameters for parameterisable and/or programmable linking of the input data, and/or b) an output for an OK or not OK signal, and wherein said decision operator includes a multi-dimensional decision field; and/or II) a pattern comparison operator that has an input port to receive an input data stream and an output port to output an output data stream and/or value corresponding to a measure of an agreement between a pattern in said input data stream and one of a plurality of patterns from a pattern database, and wherein said pattern comparison operator includes a multi-dimensional characteristic map with one or more assignment regions.

14. The measuring device as defined on claim 13, wherein said decision operator includes three decision fields that each have at least one temporally variable boundary line.

15. The measuring device as defined in claim 13, wherein said pattern comparison operator identifies event patterns and/or fault patterns.

16. An operator network comprising at least one pattern recognition operator, a free pattern operator, and/or at least one decision operator as defined in claim 13.

17. The operator network as defined in claim 16, further including a visualization operator, a machine control operator, and/or a difference operator.

18. The operator network as defined in claim 16, wherein a plurality of operators are arranged in parallel or cascading form.

19. A mobile device that includes an independent power supply and one or more of a sensor and display module; said mobile device is configured to function as an operator with an input and/or output data stream for embedding in said operator network and/or in said measuring device as defined in claim 13.

20. A device for identifying events in a material processing and/or production process on the basis of a multi-dimensional data stream obtained during said process with time-resolved frequency and energy information by using fault and/or event patterns and/or energy data; said device is configured to enable said data to pass through one pattern operator or a plurality of pattern operators that are arranged in parallel or in succession and are supplied to one decision operator or a plurality of decision operators arranged in parallel or in succession as defined in claim 13.

21. A graphical user interface for creating and/or editing a network of operators, and/or a measuring device comprising a graphical user interface, wherein there is provided graphical positioning and linking of one or more of said operators as defined in claim 13.

22. A method for creating and/or editing said operator network as defined in claim 13.

* * * * *